United States Patent
Barnett

(10) Patent No.: US 11,995,975 B2
(45) Date of Patent: May 28, 2024

(54) APPARATUS FOR PROVIDING EMERGENCY FEATURE ACTIVATION FOR MOBILE ELECTRONIC DEVICES

(71) Applicant: PopSockets LLC, Boulder, CO (US)

(72) Inventor: David B. Barnett, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 188 days.

(21) Appl. No.: 17/502,400

(22) Filed: Oct. 15, 2021

(65) Prior Publication Data

US 2022/0130229 A1    Apr. 28, 2022

Related U.S. Application Data

(60) Provisional application No. 63/105,145, filed on Oct. 23, 2020.

(51) Int. Cl.
  *G08B 25/01*   (2006.01)
  *A45C 11/00*   (2006.01)
  *H04B 1/3888*  (2015.01)
  *H04M 1/02*    (2006.01)

(52) U.S. Cl.
  CPC ............ *G08B 25/016* (2013.01); *A45C 11/00* (2013.01); *H04B 1/3888* (2013.01); *H04M 1/0208* (2013.01); *A45C 2011/002* (2013.01)

(58) Field of Classification Search
  CPC ..... A45C 11/00; H04B 1/3888; H04M 1/0208
  USPC .................................................. 455/404.01
  See application file for complete search history.

(56) References Cited

U.S. PATENT DOCUMENTS

| | | | |
|---|---|---|---|
| 9,101,188 B2 * | 8/2015 | Magness ................ | A45C 11/00 |
| 9,473,192 B2 | 10/2016 | Fathollahi et al. | |
| 9,917,937 B1 * | 3/2018 | Fathollahi ............ | H04B 1/3888 |
| 2013/0214018 A1 * | 8/2013 | Zhang ................... | A45C 11/182 |
| | | | 224/269 |
| 2013/0271902 A1 * | 10/2013 | Lai ........................ | H05K 5/0086 |
| | | | 361/679.01 |
| 2014/0239916 A1 | 8/2014 | To et al. | |
| 2015/0194995 A1 | 7/2015 | Fathollahi | |
| 2016/0156754 A1 | 6/2016 | Cotelo | |
| 2016/0301440 A1 * | 10/2016 | Poon ...................... | A45C 11/00 |

OTHER PUBLICATIONS

Transmittal of the International Search Report and Written Opinion issued in PCT/US21/55164 dated Jan. 24, 2022.

* cited by examiner

*Primary Examiner* — Maria El-Zoobi
(74) *Attorney, Agent, or Firm* — Irell & Manella LLP

(57) ABSTRACT

A case includes a case body configured to be equipped by the mobile electronic device. The case body includes at least two button accessing means and the mobile electronic device includes at least two physical buttons. The case further includes an actuator coupled to the case body and movable between at least a first position and a second position, where the actuator comprises two or more engagement members. The engagement members, in cooperation with the button accessing means, depress corresponding physical buttons of the mobile electronic device when the mobile electronic device is equipped with the case and the actuator is in the second position. The engagement members are configured to not depress corresponding physical buttons of the mobile electronic device when the actuator is in the first position.

20 Claims, 3 Drawing Sheets

APPARATUS FOR PROVIDING EMERGENCY FEATURE ACTIVATION FOR MOBILE ELECTRONIC DEVICES

CROSS-REFERENCE TO RELATED APPLICATIONS

This application claims the benefit of U.S. Provisional Application No. 63/105,145, filed on Oct. 23, 2020.

FIELD OF THE DISCLOSURE

The present disclosure generally relates to an apparatus for activating emergency features of a mobile electronic device, and more particularly to a mobile device case or add-on assembly that is configured to facilitate easy activation of the emergency features of a mobile electronic device.

BACKGROUND

Mobile electronic devices are typically equipped with built-in emergency features which can be activated by the user upon pressing multiple physical buttons on the device, either in a particular sequence or for a threshold amount of time. This can be a cumbersome process for the user, and can be particularly difficult to execute in an actual emergency. Moreover, some users may have physical limitations preventing them from being able to press multiple buttons at the same time or for a requisite period of time.

SUMMARY

The disclosure relates to a case adapted to be equipped by a mobile electronic device. In certain embodiments, the case comprises a case body configured to be equipped by the mobile electronic device, wherein the case body comprises at least two button accessing means and wherein the mobile electronic device comprises at least two physical buttons. The case further comprises an actuator coupled to the case body and movable between at least a first position and a second position, the actuator comprising two or more engagement members. The engagement members, in cooperation with the button accessing means, are configured to depress corresponding physical buttons of the mobile electronic device when the mobile electronic device is equipped with the case and the actuator is in the second position. The engagement members are further configured to not depress corresponding physical buttons of the mobile electronic device when the actuator is in the first position.

In certain embodiments, each of the at least two button accessing means comprises an aperture formed in the case body.

In certain embodiments, each of the at least two button accessing means comprises a flexible or semi-rigid button formed in the case body.

In certain embodiments, the actuator comprises a lever hingeably attached to opposing side of the case body.

In certain embodiments, the two or more engagement members comprise a first tab formed on a first side of the actuator and a second tab formed on a second side of the actuator, wherein the first side of the actuator is attached to a first side of the case body and the second side of the actuator is attached to a second side of the case body.

In certain embodiments, when the actuator is in the second position (i) the first tab in cooperation with one of the two or more button accessing means causes a corresponding first physical button of the mobile electronic device to be depressed, and (ii) the second tab in cooperation with another of the two or more button accessing means causes a corresponding second physical button of the mobile electronic device to be depressed.

In certain embodiments, depressing the first physical button and the second physical button at approximately the same time corresponds to an emergency activation feature of the mobile electronic device.

In certain embodiments, the actuator is movable between the at least first position and second position by a force applied by a user or by a mechanical-electrical assembly.

In certain embodiments, the actuator comprises a slide that slidably engages opposing sides of the case body.

In certain embodiments, the slide comprises an integrally formed user control member by which a user moves the slide between the first and second positions.

In certain embodiments, the two or more engagement members comprise a first wing formed on a first side of the actuator and a second wing formed on a second side of the actuator, wherein the first side of the actuator is attached to a first side of the case body and the second side of the actuator is attached to a second side of the case body.

In certain embodiments, when the actuator is in the second position (i) the first wing in cooperation with one of the two or more button accessing means causes a corresponding first physical button of the mobile electronic device to be depressed, and (ii) the second wing in cooperation with another of the two or more button accessing means causes a corresponding second physical button of the mobile electronic device to be depressed.

In certain embodiments, depressing the first physical button and the second physical button at approximately the same time corresponds to an emergency activation feature of the mobile electronic device.

DETAILED DESCRIPTION

According to one or more examples of the present disclosure, a mechanical or mechanical-electrical assembly for a mobile electronic device is configured to carry out an emergency feature activation which comprises pressing multiple physical buttons on the device, either in a particular sequence or for a threshold amount of time. In certain embodiment, the assembly is actuated using a single point of user input that is converted into a multipoint input that corresponds to a mobile electronic device's emergency feature activation sequence.

It should be appreciated that the mechanical or mechanical-electrical assembly may be configured as a mobile electronic device case or may be an add-on assembly. In the case of a mechanical assembly, it should be appreciated that actuation of the assembly may be carried out by a user applying a designated manual force that causes one or more mechanical components of the assembly to move into a position that results in multiple physical buttons of the mobile electronic device to be depressed at the same time, where the buttons being depressed correspond to a sequence or duration required for activation of an emergency feature of the mobile electronic device.

Alternatively, in the case of a mechanical-electrical assembly, actuation of the assembly may be carried out by a user applying a designated manual force which activates an electrical circuit of the assembly which, in turn, is coupled to one or more mechanical components of the assembly that move into a position that results in multiple physical buttons of the mobile electronic device being depressed at the same time where, again, the buttons being depressed correspond to a sequence or duration required for activation of an emergency feature of the mobile electronic device.

Finally, while the disclosure herein is presented with a focus on emergency feature activation, it should be equally appreciated that the disclosed invention is equally applicable in the context of any other mobile device feature which requires the depression of multiple buttons/switches or requires depression of a single button for an extended period of time, e.g., powering on the device, performing a reset, taking a screenshot, etc.

Figure 1B:
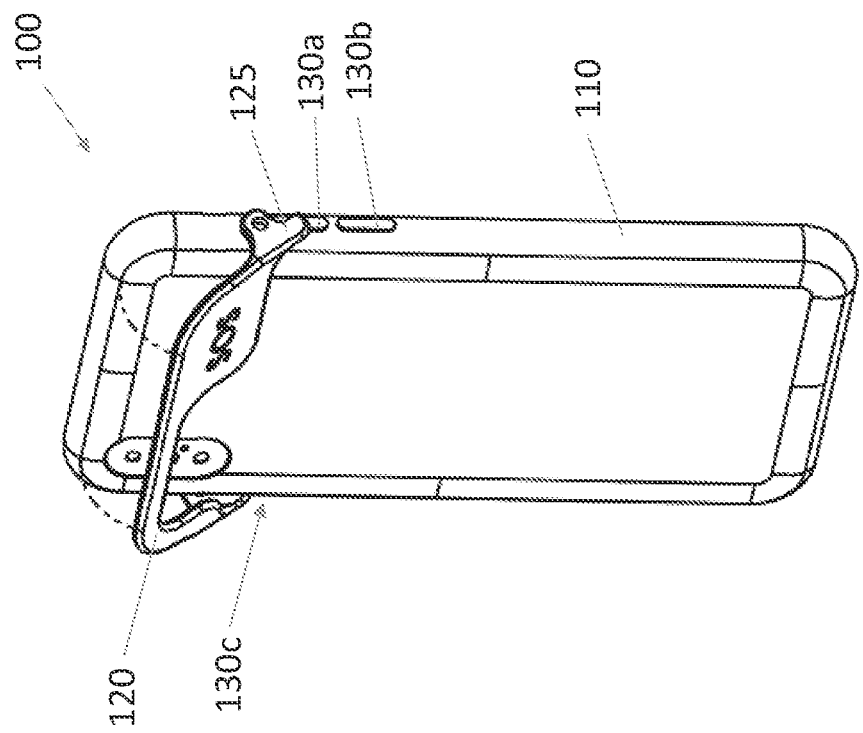
FIGS. 1A-1B depict different operating positions for a first embodiment of a mobile device case configured in accordance with the principles of the invention.
Figure 1A:
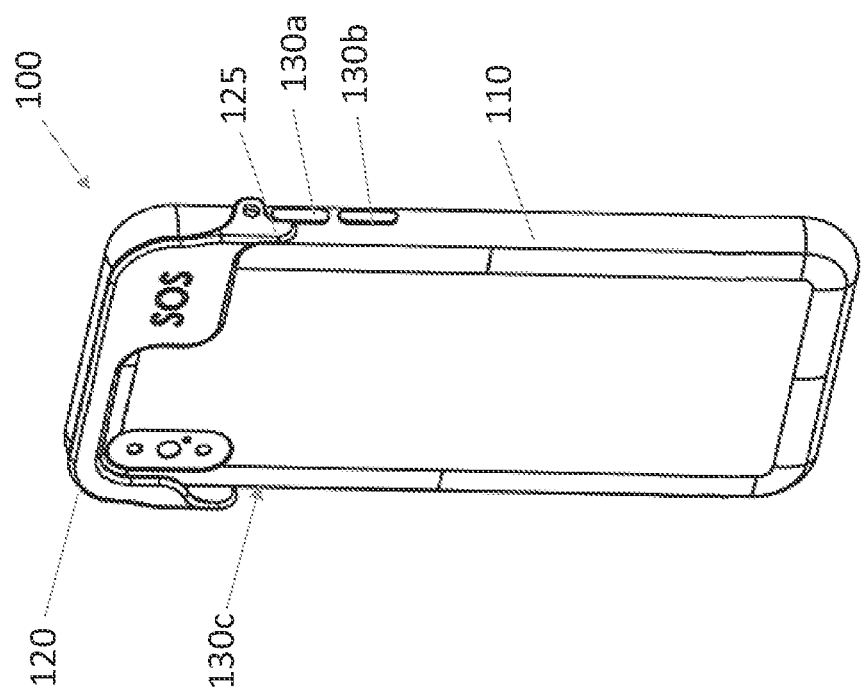

Referring now to FIGS. 1A-1B, depicted is a mobile electronic device which is equipped with a case 100 configured in accordance with the principles of the invention. The case 100 comprises a case body 110, an actuator in the form of a mechanical lever 120 attached on lateral sides of the case, as shown in FIGS. 1A-1B, and engagement members in the form of tabs 125 on either side of the case. Moreover, the case 100 for a mobile electronic device may be configured with button accessing means (e.g., plurality of buttons/apertures 130a-130c) disposed on both or either side of the case 100. Of course, it should be appreciated that the case 100 may comprise more or few button accessing means, or that buttons/apertures 130a-130c may be disposed in different locations along the case 100 so as to align with one or more corresponding physical buttons of the mobile electronic device on which the case 100 is equipped. The button accessing means (e.g., buttons/apertures 130a-130c) may comprise a flexible or semi-rigid material, for example, that slightly protrudes from the case body 110 in order to cover and accommodate corresponding physical buttons of the mobile electronic device on which the case 100 is equipped. Alternatively, button accessing means (e.g., buttons/apertures 130a-130c) may comprise apertures through which corresponding physical buttons of the mobile electronic device may protrude. Whether button accessing means (e.g., buttons/apertures 130a-130c) comprises flexible or semi-rigid material that cover and accommodate corresponding buttons of a mobile electronic device, or whether button accessing means (e.g., buttons/apertures 130a-130c) comprises apertures through which corresponding physical buttons of the mobile electronic device may protrude, it should be appreciated that case 100 is configured to provide access to one or more physical buttons of a mobile electronic device on which the case 100 is equipped. In particular, such access permits the one or more mobile device buttons to be actuated by an external mechanical force, as described in more detail below.

Continuing to refer to FIGS. 1A-1B, FIG. 1A depicts a first operating position of the actuator, e.g., lever 120, in which the lever 120 is in a vertical position and, as a result, the engagement members, e.g., tabs 125, are adjacent, but not in contact with buttons/apertures 130a and 130c, respectively. FIG. 1B depicts a second operating position of the lever 120 in which the lever 120 has now been moved from the vertical position to a skewed position and, as a result, tabs 125 are caused to move over the top of and thereby apply a mechanical force in the region defined by the buttons/apertures 130a and 130c, as shown. As a result, the corresponding physical buttons of the mobile electronic device may be depressed. In this fashion, the user is able to provide a single, simple point of input (pushing the lever 120 down) that is converted by the assembly into a multipoint input (e.g., depressing physical buttons of the mobile device corresponding to both buttons/apertures 130a and 130c). In certain embodiments, the multipoint input preferably corresponds to a mobile electronic device's emergency feature activation sequence.

Moreover, it should be appreciated that case 100 may be configured to advantageously maintain the multipoint input without there being maintained user input for any extended period of time because the physical buttons of the mobile electronic device corresponding to the locations of the buttons/apertures 130a and 130c will continue to be depressed by tabs 125 even after the user stops making contact with the lever 120 (unless otherwise equipped with a spring or biased hinge, which may be preferable in certain embodiments). Finally, it should also be appreciated that a length of the tabs 125 may vary depending on mobile device button location, or if it is desirable to actuate additional mobile device buttons, such as a physical button of the mobile device corresponding to the lower button/aperture 130b.

Figure 2B:
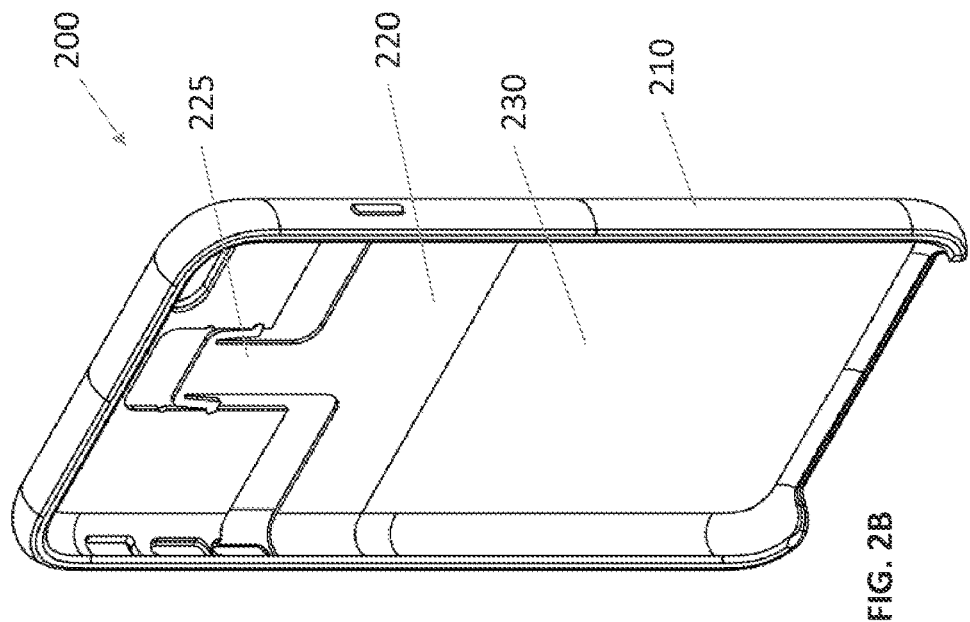
FIGS. 2A-2B depict a second embodiment of a mobile device case configured in accordance with the principles of the invention.
Figure 2A:
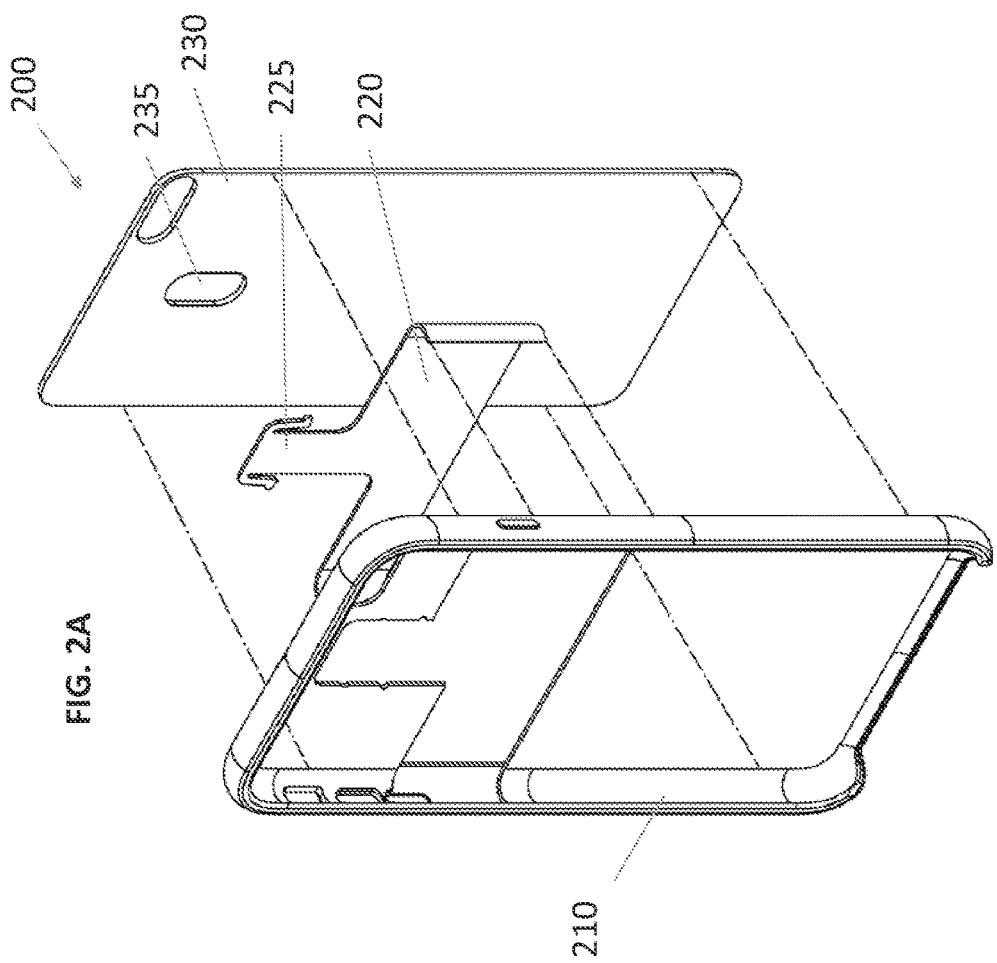

Referring now to FIGS. 2A-2B, depicted is a second embodiment of a mobile device case configured in accordance with the principles of the invention. Here, case 200 is comprised of a case body 210, an actuator in the form of a slide 220 and an optional back plate 230. The actuator, e.g., slide 220, is configured to engage the body 210, as shown in FIG. 2B, along interior side surfaces. Specifically, slide 220 comprises engagement members in the form of curved wing portions disposed on opposite sides that are configured to conform to and be slideably engaged with an inner (or outer) side surface of the body 210. Slide 220 further includes user control member 225 which is configured to serve as a point of user contact for actuating the slide 220, as further described with reference to FIG. 3 below. Optional back plate 230 may be used to provide rear protection for a mobile device and/or to secure the slide 220 to the body 210. When optional back plate 230 is used, it may be configured with access port 235 in order to provide user access to the user control member 225 for actuating the slide 220.

As shown in FIGS. 2A-2B, case 200 may similarly be configured with one or more buttons/apertures (not labeled) that are substantially similar to buttons/apertures 130a-130c of FIGS. 1A-1B, and which may similarly correspond to locations of physical buttons of a mobile electronic device on which the case 200 is equipped.

Figure 3:
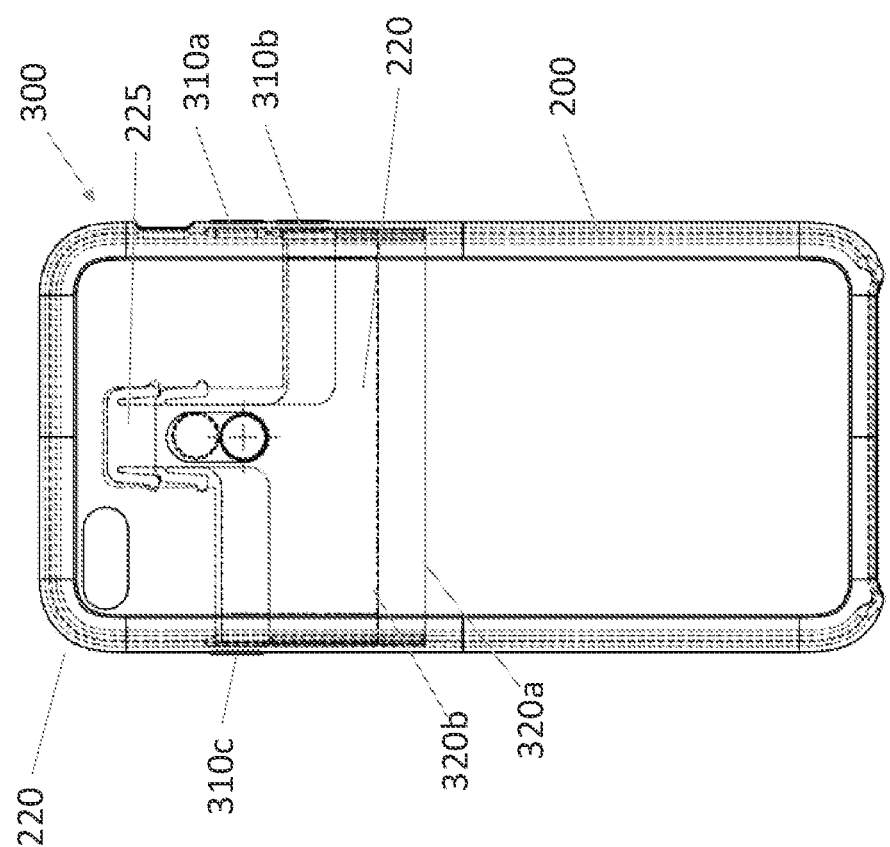
FIG. 3 depicts different operating positions for the second embodiment of FIGS. 2A-2B.

Referring now to FIG. 3, depicted is a mobile device 300 equipped with the case 200 of FIGS. 2A-2B, showing two different operating positions of the case 200. Specifically, in a first position 320a, the slide 220 is in a lower position such that its curved wing portions are situated below all of the physical buttons 310a-310c of the mobile device 300. As described above, case 200 is configured with one or more buttons/apertures (not labeled), which are substantially similar to buttons/apertures 130a-130c of FIGS. 1A-1B, which are correspond to the locations of the physical buttons 310a-310c of the mobile device 300 when equipped thereon.

By virtue of the slide 220 being slideably engaged with an inner (or outer) side surface of the case 200, as described above, the slide 220 may be moved from the first position 320a to a second position 320b by, for example, a user contacting and sliding up the user control member 225. Since the second position 320b is higher than the first position 320a, the curved wing portions of the slide 220 will slide over the top of and thereby depress the physical buttons 310b and 310c of the mobile device, as shown, through corresponding buttons/apertures of the case 200, as described above. In this fashion, the user is able to provide a single, simple point of input (sliding the user control member 225 up) that is converted by the assembly into a multipoint input (e.g., depressing both buttons 310b and 310c) where the multipoint input preferably corresponds to a mobile electronic device's emergency feature activation sequence.

Moreover, as with the first embodiment above, it should be appreciated that case 200 may be configured to advantageously maintain the multipoint input without maintained user input because buttons 310b and 310c will continue to be depressed by the wing portions of the slide 220 even after the user stops making contact with the user control member 225 (unless otherwise equipped with a biasing towards the first position 320a, which may be preferable in certain embodiments). Finally, while the winged portions of the slide 220 are configured to engage buttons 310b and 310c in this example, it should equally be appreciated that the winged portions may be configured to engage buttons 310a and 310b, but not 310c, in the second position 320b, or even to engage buttons 310a and 310c, and not 310b, by for example including a notch (not shown) through which button 310b is allowed to project and remain un-pressed when the slide 220 is in the second position 320b.

It should be appreciated that the above two embodiments are merely exemplary and that many other configurations are within the scope of this disclosure including, as noted above, mechanical-electrical assemblies, as well as numerous other mechanical-only assembles.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A case adapted to be equipped by a mobile electronic device comprising:
    a case body configured to be equipped by the mobile electronic device, wherein the case body comprises at least two button accessing means and wherein the mobile electronic device comprises at least two physical buttons; and
    an actuator coupled to the case body and movable between at least a first position and a second position, the actuator comprising two or more engagement members,
    wherein the engagement members, in cooperation with the button accessing means, depresses corresponding physical buttons of the mobile electronic device when the mobile electronic device is equipped with the case and the actuator is in the second position, and
    wherein the engagement members does not depress corresponding physical buttons of the mobile electronic device when the actuator is in the first position.

2. The case of claim 1, wherein each of the at least two button accessing means comprises an aperture formed in the case body.

3. The case of claim 1, wherein each of the at least two button accessing means comprises a flexible or semi-rigid button formed in the case body.

4. The case of claim 1, wherein the actuator comprises a lever hingeably attached to opposing side of the case body.

5. The case of claim 4, wherein the two or more engagement members comprise a first tab formed on a first side of the actuator and a second tab formed on a second side of the actuator, wherein the first side of the actuator is attached to a first side of the case body and the second side of the actuator is attached to a second side of the case body.

6. The case of claim 5, wherein, when the actuator is in the second position (i) the first tab in cooperation with one of the two or more button accessing means causes a corresponding first physical button of the mobile electronic device to be depressed, and (ii) the second tab in cooperation with another of the two or more button accessing means causes a corresponding second physical button of the mobile electronic device to be depressed.

7. The case of claim 6, wherein depressing the first physical button and the second physical button at approximately the same time corresponds to an emergency activation feature of the mobile electronic device.

8. The case of claim 1, wherein the actuator is movable between the at least first position and second position by a force applied by a user or by a mechanical-electrical assembly.

9. The case of claim 1, wherein the actuator comprises a slide that slidably engages opposing sides of the case body.

10. The case of claim 9, wherein the slide comprises an integrally formed user control member by which a user moves the slide between the first and second positions.

11. The case of claim 9, wherein the two or more engagement members comprise a first wing formed on a first side of the actuator and a second wing formed on a second side of the actuator, wherein the first side of the actuator is attached to a first side of the case body and the second side of the actuator is attached to a second side of the case body.

12. The case of claim 11, wherein, when the actuator is in the second position (i) the first wing in cooperation with one of the two or more button accessing means causes a corresponding first physical button of the mobile electronic device to be depressed, and (ii) the second wing in cooperation with another of the two or more button accessing means causes a corresponding second physical button of the mobile electronic device to be depressed.

13. The case of claim 12, wherein depressing the first physical button and the second physical button at approximately the same time corresponds to an emergency activation feature of the mobile electronic device.

14. A case adapted to be equipped by a mobile electronic device comprising:
    a case body configured to be equipped by the mobile electronic device, wherein the case body comprises at least two case buttons or apertures and wherein the mobile electronic device comprises at least two physical buttons; and
    a lever hingeably attached to opposing side of the case body and movable between at least a first position and a second position, the lever comprising at least two tabs,
    wherein the at least two tabs, in cooperation with the at least two case buttons or apertures, depresses corresponding physical buttons of the mobile electronic device when the mobile electronic device is equipped with the case and the lever is in the second position, and
    wherein the at least two tabs do not depress corresponding physical buttons of the mobile electronic device when the lever is in the first position.

15. The case of claim 14, wherein the at least two tabs comprises a first tab formed on a first side of the lever and a second tab formed on a second side of the lever, wherein the first side of the lever is attached to a first side of the case body and the second side of the lever is attached to a second side of the case body.

16. The case of claim 15, wherein, when the lever is in the second position (i) the first tab in cooperation with the at least two case buttons or apertures causes a corresponding first physical button of the mobile electronic device to be depressed, and (ii) the second tab in cooperation with another of the at least two case buttons or apertures causes a corresponding second physical button of the mobile electronic device to be depressed.

17. A case adapted to be equipped by a mobile electronic device comprising:
    a case body configured to be equipped by the mobile electronic device, wherein the case body comprises at least two case buttons or apertures and wherein the mobile electronic device comprises at least two physical buttons; and
    a slide that slidably engages opposing sides of the case body and is movable between at least a first position and a second position, the slide comprising: (i) an integrally formed user control member by which a user moves the slide between the first and second positions, and (ii) a first wing and a second wing,
    wherein the first and second wings, in cooperation with the at least two case buttons or apertures, depresses corresponding physical buttons of the mobile electronic device when the mobile electronic device is equipped with the case and the slide is in the second position, and
    wherein the first and second wings do not depress corresponding physical buttons of the mobile electronic device when the slide is in the first position.

18. The case of claim 17, wherein the first wing is formed on a first side of the slide and a second wing is formed on a second side of the slide, wherein the first side of the slide is configured to engage a first side of the case body and the second side of the slide is configured to engage a second side of the case body.

19. The case of claim 18, wherein, when the slide is in the second position (i) the first wing in cooperation with the at least two case buttons or apertures causes a corresponding first physical button of the mobile electronic device to be depressed, and (ii) the second wing in cooperation with another of the at least two case buttons or apertures causes a corresponding second physical button of the mobile electronic device to be depressed.

20. The case of claim 1, wherein depressing said corresponding physical buttons of the mobile electronic device at approximately the same time corresponds to an emergency activation feature of the mobile electronic device.

\* \* \* \* \*